(12) United States Patent
Narita et al.

(10) Patent No.: US 8,416,204 B2
(45) Date of Patent: Apr. 9, 2013

(54) INFORMATION PROCESSING APPARATUS AND INFORMATION PROCESSING METHOD

(75) Inventors: Tomoya Narita, Kanagawa (JP); Reiko Miyazaki, Tokyo (JP); Tatsushi Nashida, Kanagawa (JP)

(73) Assignee: Sony Corporation, Tokyo (JP)

( * ) Notice: Subject to any disclaimer, the term of this patent is extended or adjusted under 35 U.S.C. 154(b) by 360 days.

(21) Appl. No.: 12/503,552

(22) Filed: Jul. 15, 2009

(65) Prior Publication Data

US 2010/0020048 A1 Jan. 28, 2010

(30) Foreign Application Priority Data

Jul. 24, 2008 (JP) ................ P2008-190976

(51) Int. Cl.
*G06F 3/041* (2006.01)
(52) U.S. Cl. ............. 345/173; 345/184; 345/169
(58) Field of Classification Search .......... 345/156, 345/169–181
See application file for complete search history.

(56) References Cited

U.S. PATENT DOCUMENTS

| | | | |
|---|---|---|---|
| 4,471,465 A | | 9/1984 | Mayer et al. |
| 5,254,984 A | | 10/1993 | Wakeland |
| 6,909,424 B2 * | 6/2005 | Liebenow et al. | 345/169 |
| 7,088,342 B2 * | 8/2006 | Rekimoto et al. | 345/169 |
| 7,403,192 B2 * | 7/2008 | Lai | 345/173 |
| 7,565,393 B2 * | 7/2009 | Lakdawala et al. | 708/819 |
| 7,593,005 B2 * | 9/2009 | Bayramoglu | 345/177 |
| 7,705,799 B2 * | 4/2010 | Niwa | 345/1.1 |
| 7,800,592 B2 * | 9/2010 | Kerr et al. | 345/173 |
| 2003/0184528 A1 * | 10/2003 | Kawasaki et al. | 345/173 |
| 2003/0234768 A1 * | 12/2003 | Rekimoto et al. | 345/169 |
| 2005/0104855 A1 * | 5/2005 | Grossmeyer | 345/169 |
| 2005/0251760 A1 * | 11/2005 | Sato et al. | 715/856 |
| 2007/0283292 A1 * | 12/2007 | Bucher et al. | 715/810 |
| 2008/0204424 A1 * | 8/2008 | Jin et al. | 345/173 |

FOREIGN PATENT DOCUMENTS

| | | |
|---|---|---|
| JP | 9-311799 | 12/1997 |
| JP | 11-249784 | 9/1999 |
| JP | 2002-82745 | 3/2002 |
| JP | 2006-004292 | 1/2006 |
| JP | 2006-268295 | 10/2006 |
| JP | 2008-016178 | 1/2008 |

OTHER PUBLICATIONS

Decision of Refusal for Japanese Patent Application No. 2008-190976, dated Jun. 18, 2010, from the Japanese Patent Office.

(Continued)

*Primary Examiner* — Duc Dinh
(74) *Attorney, Agent, or Firm* — Sherr & Jiang, PLLC

(57) ABSTRACT

The present invention provides an information processing apparatus capable of displaying a plurality of elements at a display unit by being superimposed and selecting an arbitrary element rapidly and easily among the plurality of elements by the user and an information processing method. The information processing apparatus includes an input reception unit to which signals are input from a first operation unit and a second operation unit, and a display control unit by which a plurality of first elements and a plurality of second elements are displayed by being superimposed. The first elements are arranged to be selectable or movable in accordance with the input of the first operation unit on a virtual first layer and the second elements are arranged to be selectable or movable in accordance with the input of the second operation unit on a virtual second layer which differs from the first layer.

6 Claims, 13 Drawing Sheets

OTHER PUBLICATIONS

Tetsuji Sekiguchi, "Emergence of New CLIE Excellent Points of a New Dimension Palm Device, PEG-NX7OV and 60 Application Software, 3. Visual Version, Let's Enjoy Visual wit an Internal Camera/Wide High Resolution", Mobile Press vol. 3, No. 1, GijustsuHyoronsha Corporation Co., Ltd., Feb. 24, 2003, vol. 3, No. 1, pp. 12-15.

Yasuyuki Sasaki, "Future of Pen Devices Based on Notebook Selection—Compaq Tablet PC TC1000", Mobile PRESS vol. 3 No. 1, GijutsuHyoron Corporation Co., Ltd., Feb. 24, 2003, vol. 3 No. 1, p. 17-183.

Suguru Kunii, "Windows Mobiel World Vo 1.01", Windows Server World vol. 13 No. 8, IDG Japan Co., Ltd., Aug. 1, 2008, vol. 13, No. 8, pp. 59-68.

European Search Report for EP 09 25 1422 dated Aug. 24, 2009.

* cited by examiner

INFORMATION PROCESSING APPARATUS AND INFORMATION PROCESSING METHOD

BACKGROUND OF THE INVENTION

1. Field of the Invention

The present invention relates to an information processing apparatus and an information processing method.

2. Description of Related Art

A personal computer or a portable audio player which outputs music and images etc. stores a plurality of data, such as music data and image data, and displays titles of the plurality of data in a list form at a display unit. Accordingly, the user can arbitrarily select data among entries of the plurality of titles which are displayed in a list form and start a process to reproduce the desired data, as disclosed in Japanese Patent Application Laid-Open No. 9-311799, Japanese Patent Application Laid-Open No. 2002-82745 and the like.

SUMMARY OF THE INVENTION

In related art, in a case that a plurality of data which has a layer structure are displayed in a screen of a display unit, it has been difficult to simultaneously display items of a lower layer and items of an upper layer when items such as the titles of the plurality of data are to be displayed by icons, character strings and the like. Further, even when the items of the plurality of data are to be displayed in a tree form, the lower layer item is not displayed in the screen unless the upper layer item is selected.

Therefore, in order to find lower layer data, the lower layer item has been needed to be supposed from the upper layer items. Here, in a case that the desired data is not found when lower layer items are displayed by selecting an upper layer item, it has been needed to return to the upper layer and select another upper layer item in order to display the lower layer item.

The present invention has been made in view of the above issue, and it is desirable to provide a novel and improved information processing apparatus capable of displaying a plurality of elements at a display unit by being superimposed and selecting an arbitrary element rapidly and easily among the plurality of elements by the user and an information processing method.

According to an embodiment of the present invention, there is provided an information processing apparatus including: an input reception unit to which signals are input from a first operation unit which receives external operation and a second operation unit which receives external operation and which differs from the first operation unit; and a display control unit by which a plurality of first elements and a plurality of second elements are displayed by being superimposed; the first elements being arranged to be selectable or movable in accordance with the input of the first operation unit on a virtual first layer and the second elements being arranged to be selectable or movable in accordance with the input of the second operation unit on a virtual second layer which differs from the first layer.

The first element may be a character string and the second element may be an image.

The layer which includes a group of the plurality of first elements may be lower than the layer which includes the second element.

The first operation unit may be a plane member which is arranged by being superimposed to the display unit.

The first element may be a character string which indicates music information, and the second element may be an image which indicates the music information.

Furthermore, according to another embodiment of the present invention, there is provided an information processing method including the steps of: inputting signals to an input reception unit from a first operation unit which receives external operation and a second operation unit which receives external operation and which differs from the first operation unit; and displaying a plurality of first elements and a plurality of second elements by a display control unit; the first elements being arranged to be selectable or movable in accordance with the input of the first operation unit on a virtual first layer and the second elements being arranged to be selectable or movable in accordance with the input of the second operation unit on a virtual second layer which differs from the first layer.

According to the embodiments of the present invention, a plurality of elements can be displayed at a display unit by being superimposed and an arbitrary element can be selected rapidly and easily among the plurality of elements by the user.

DETAILED DESCRIPTION OF PREFERRED EMBODIMENTS

Figure 1:
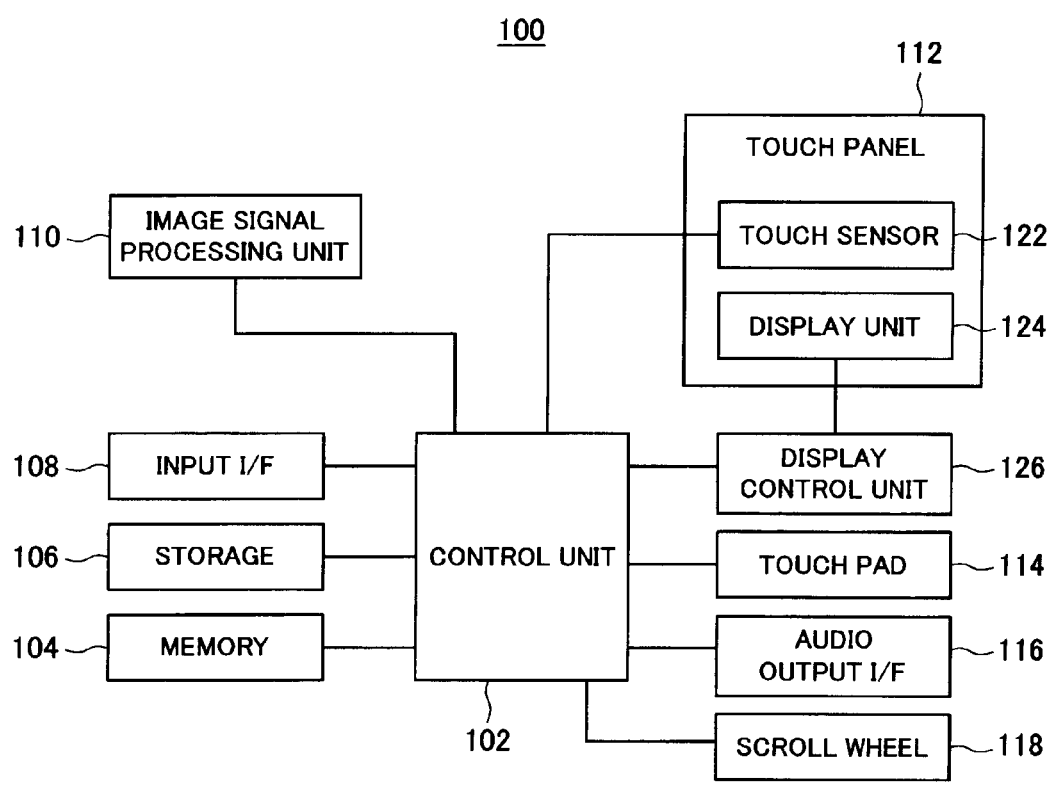
FIG. 1 is a block diagram which illustrates an information processing apparatus according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

First, an information processing apparatus 100 according to an embodiment of the present invention is described. FIG. 1 is a block diagram which illustrates the information processing apparatus 100 according to the present embodiment.

For example, the information processing apparatus 100 according to the present embodiment includes a control unit 102, a memory 104, a storage 106, an input I/F 108, an image signal processing unit 110, a touch panel 112, a touch pad 114, an audio output I/F 116, a scroll wheel 118 and the like.

For example, the information processing apparatus 100 is a personal computer, an audio player, a media player, a PDA (Personal Digital Assistant), a cellular phone or the like which can be easily took along by the user.

The control unit 102 includes a microcomputer which is configured by combining a CPU (Central Processing Unit), a ROM (Read Only Memory), a RAM (Random Access Memory) etc. The control unit 102 functions as an arithmetic processing device and a control device with a program and controls each of the above constitutional elements of the information processing apparatus 100. The control unit 102 is an example of an input reception unit to which signals from the touch panel 112 for receiving external operation and the touch pad 114 for receiving external operation are input.

The memory 104 is configured with a storage unit such as a RAM, a ROM and a cache memory, for example. The memory 104 has a function to temporarily store data regarding processing of the CPU of the control unit 102, operation programs of the CPU and the like.

The storage 106 is a hard disc, an optical disc, a flash memory or the like, for example. The storage 106 is a storage unit which stores data in the long term. For example, the storage 106 stores music data and image data such as videos and pictures. The storage 106 stores the music data and the image data through a data reception control process and a storage control process at the control unit 102.

The input I/F 108 is a USB terminal, a terminal of IEEE 1394 or the like, for example. The input I/F 108 is an interface which is capable of connecting to an external device. A variety of data are input to the information processing apparatus 100 through the input I/F 108.

The image signal processing unit 110 performs a decode process on image signals and performs an image signal process on the decoded image signals. The image signal processing unit 110 performs necessary signal processes on the image signal, such as resolution conversion to convert into the pixel amount of a display unit 124, brightness correction, color correction, gamma correction and the like.

The touch panel 112 is an example of the first operation unit and includes a touch sensor 122, the display unit 124 and the like. The touch panel 112 receives a user's operation by detecting contact on the screen of the display unit 124. The touch panel 112 selects an item displayed at the screen and changes the display such as scrolling and zooming in accordance with the contact movement and the contact positions.

The display unit 124 is a liquid crystal display, an organic electroluminescent display or the like, for example. The display unit 124 is controlled by a display control unit 126. The display unit 124 displays a menu screen displaying a data title etc. and an image of the image data. The display control unit 126 drives the display unit 124 by utilizing the input image signal. Accordingly, the image corresponding to the image signal is displayed at the screen of the display unit 124. The display control unit 126 performs a reproduction process of the image signal which is received from the image signal processing unit 110. Further, the display control unit 126 performs a combining process of the display data and generates the data which can be viewed and listened by the user with the display unit 124. The data generated at the display control unit 126 is output to the display unit 124.

The touch sensor 122 is a plane-shaped transparent member which is arranged on the display unit 124 and detects contact and the contact position by a user's finger or a stylus pen etc. The contact position which is detected by the touch sensor 122 corresponds to the screen displayed at the display unit 124. A resistance membrane method or an electrostatic capacitance method etc. can be adopted as the configuration and the operation method of the touch panel 112. Since the touch panel 112 can be actualized with ordinary technologies, the detailed description is omitted. The touch panel 112 generates an operation signal based on the contact position etc. and transmits the generated operation signal to the control unit 102.

The touch pad 114 is an example of the second operation unit and receives a user's operation by detecting contact on its surface. The touch pad 114 changes display of the screen and moves a displaying position of a cursor which is displayed in the screen in accordance with the contact movement and the contact position. The touch pad 114 is a plane-shaped member and detects contact by a user's finger. The electrostatic capacitance method etc. can be adopted as the configuration and the operation method of the touch pad 114. Since the touch pad 114 can be actualized with ordinary technologies, the detailed description is omitted. The touch pad 114 generates an operation signal based on the contact position etc. and transmits the generated operation signal to the control unit 102.

The audio output I/F 116 is a terminal such as a phone plug and is connected to the external device such as a headphone and a speaker etc. The audio output I/F 116 outputs the reproduced audio data to the external device.

The scroll wheel 118 is a disc-shaped member, for example, and detects rotation around the center of the disc by a user's operation. The scroll wheel 118 transmits the operation signal which is generated by the rotation of the scroll wheel 118 to the control unit 102. The rotation detected by the scroll wheel 118 corresponds to the movement (scrolling display) in the screen of the display unit 124 in the vertical direction or the horizontal direction.

Figure 2A:
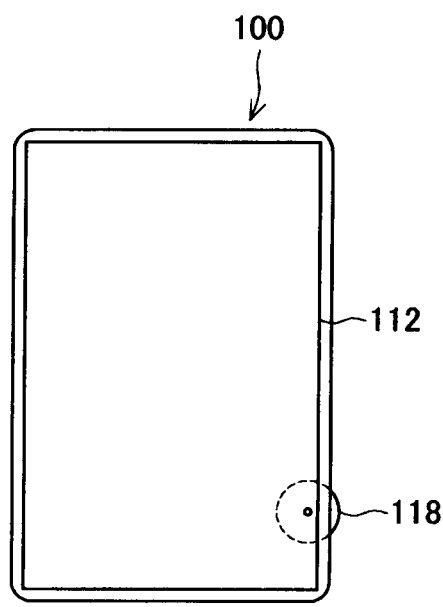
FIG. 2A and FIG. 2B are respectively a front view and a back view which illustrate the information processing apparatus according to the present embodiment.
Figure 2B:
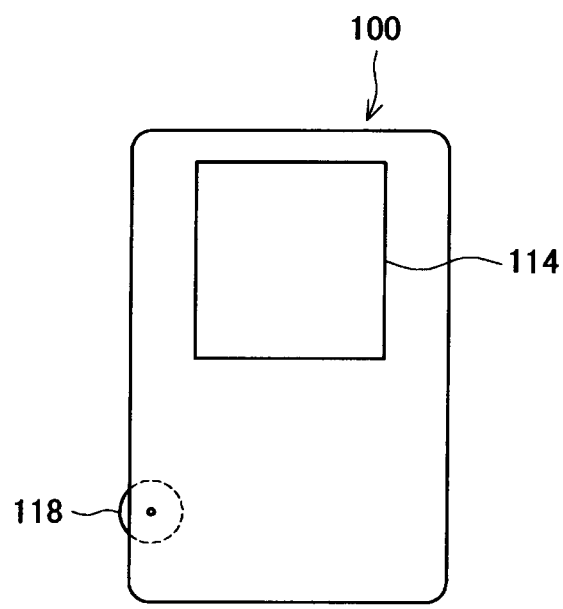

Next, an example of the appearance of the information processing apparatus 100 according to the present embodiment is described. FIG. 2A and FIG. 2B are respectively a front view and a back view which illustrate the information processing apparatus 100 according to the present embodiment. FIG. 2A is a view which illustrates a surface of one side of the appearance of the information processing apparatus 100. FIG. 2B is a view of the surface of the back side of the information processing apparatus 100 against the side illustrated in FIG. 2A.

The information processing apparatus 100 according to the present embodiment has a rectangular-solid-shaped case which is similar to a plate, for example. As illustrated in FIG. 2A, the touch panel 112 is arranged at one surface side of the information processing apparatus 100. With this configuration, the user can see the display such as a menu screen and the image of the image data etc. at the surface where the touch panel 112 is arranged and perform operations via the screen of the touch panel 112.

Further, as illustrated in FIG. 2B, a touch pad 114 is arranged at the other surface side of the information processing apparatus 100. With this configuration, the user can perform operations via the touch pad 114 while ascertaining the screen of the touch panel 112. Further, the scroll wheel 118 is arranged at the information processing apparatus 100 so that a part thereof is exposed to a side surface. With this configuration, the user can perform operations via the scroll wheel 118 while ascertaining the screen of the touch panel 112.

Next, the configuration of the screen which is displayed at the touch panel 112 of the information processing apparatus 100 according to the present embodiment is described.

The screen display of the present embodiment is described in the condition that the information processing apparatus 100 stores a plurality of music data and reproduces the music data. The music data include information of albums as an upper layer and information of tracks (music) included in each album as lower layer. The information of albums includes album titles, artist names of the albums, album jackets (covers of the albums including pictures and illustrations, for example) and the like. Further, the information of tracks includes track titles, play times and the like. The layer which includes a group of a plurality of tracks is lower than the layer which includes the jackets.

Figure 7:
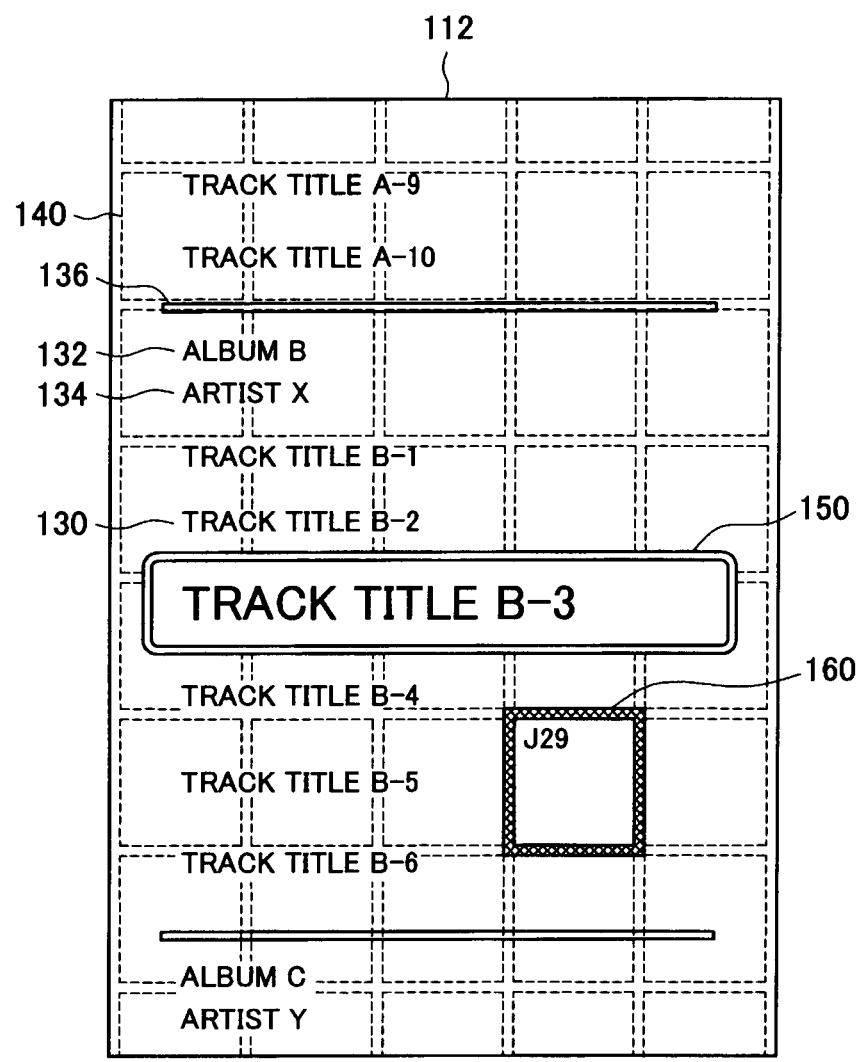
FIG. 7 is an explanatory view which illustrates an example of the screen displayed at the touch panel of the information processing apparatus of the present embodiment.

FIG. 7 is an explanatory view which illustrates an example of the screen displayed at the touch panel 112 of the information processing apparatus 100 of the present embodiment. FIG. 7 is the screen for selecting an arbitrary track among the plurality of music data.

As illustrates in FIG. 7, track titles 130, album titles 132, artist names 134, partition lines 136, jackets 140, a track selection frame 150, an album selection frame 160 and the like are displayed at the touch panel 112. The track titles 130, the album titles 132 and the artist names 134 are character strings being examples of the first element. The jackets 140 are images being examples of the second element.

With the present embodiment, the character strings such as the track titles 130 and the album titles 132 are displayed at the front surface side against the jackets 140. For example, by displaying the character strings such as the track titles 130 and the album titles 132 with deeper color than the jackets 140 which is displayed with light color, the character strings such as the track titles 130 can be displayed as if existing at the front surface. In this manner, the track titles 130 and the jackets 140 as the album information can be superimposed and displayed simultaneously. Therefore, the user can ascertain the track titles 130 and the jackets 140 simultaneously on the screen.

Figure 3:
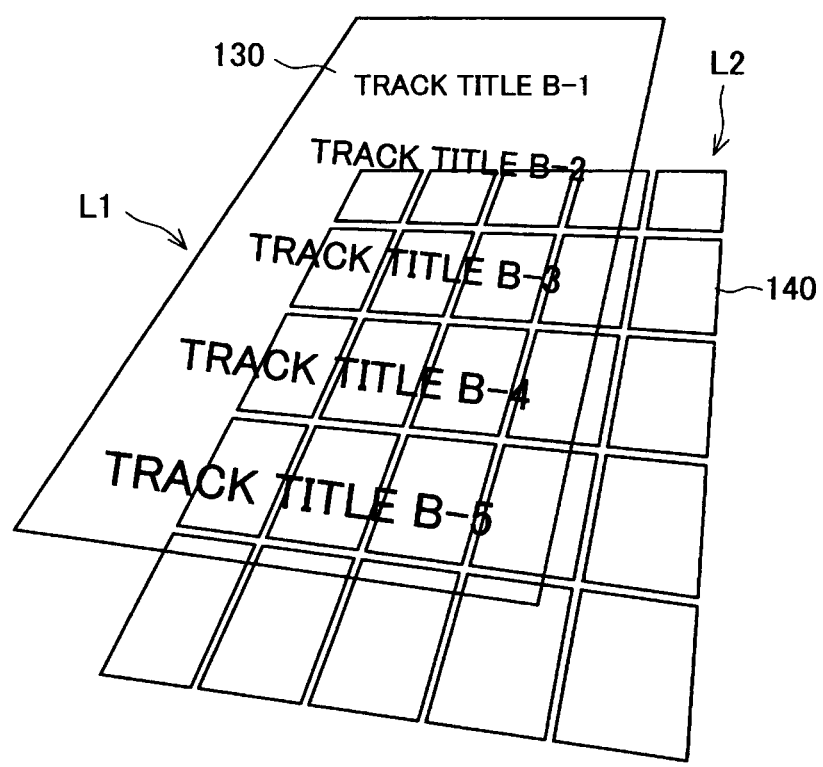
FIG. 3 is an explanatory view which illustrates a concept of a display method of a screen displayed at a touch panel of the information processing apparatus of the present embodiment.

FIG. 3 is an explanatory view which illustrates a concept of a display method of the screen displayed at the touch panel 112 of the information processing apparatus 100 of the present embodiment. In the present embodiment, the character strings such as the track titles 130 are arranged at a layer L1 which is a virtual layer and selected or moved on the layer L1. Further, the jackets 140 are arranged at a layer L2 which is a virtual layer and selected or moved on the layer L2.

Figure 4:
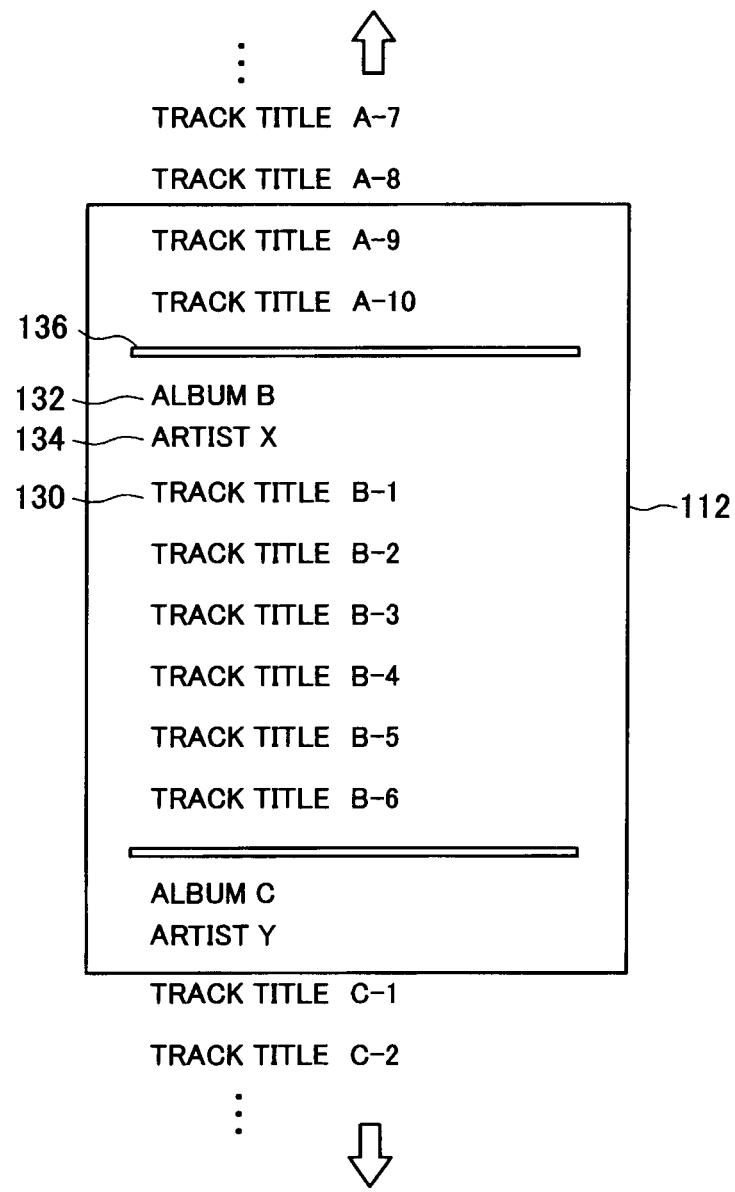
FIG. 4 is an explanatory view which illustrates the relation between character strings such as track titles arranged at a layer L1 and a touch panel.

FIG. 4 is an explanatory view which illustrates the relation between the character strings such as track titles 130 arranged at the layer L1 and the touch panel 112. The track titles 130, the album titles 132, the artist names 134 and the partition lines 136 which partition the plurality of albums are arranged at the layer L1.

In an example which is illustrated in FIG. 4, the album title 132 is album B and the artist name 134 is artist X. Further, the track titles 130 of B-1 though B-6 are included in the album B. Following the album title 132 and the artist name 134, the track titles 130 are arranged at a respective line for each of the plurality of tracks. Further, the track titles 130 (A-1 through A-10) which are included in album A are arranged prior to the album B and the track titles 130 (C-1, C-2, . . . ) which are included in album C are arranged subsequently to the album B.

Thus, the track titles 130 of the plurality of tracks are arranged at the layer L1 with the character strings respectively on a line-by-line basis. It is preferable that the character strings such as the track titles 130 are arranged so that size, intervals and layout thereof are suitable to ensure the user's legibility. The track titles 130 etc. which are arranged at the layer L1 but may not be displayed within the screen of the touch panel 112 are sequentially displayed by moving (scrolling) the layer L1 within the screen in the vertical direction, for example. The movement of the layer L1 within the screen is performed by the operation of the scroll wheel 118, for example. Instead, the movement of the layer L1 within the screen may be performed by the operation on the surface of the touch panel 112.

Figure 5:
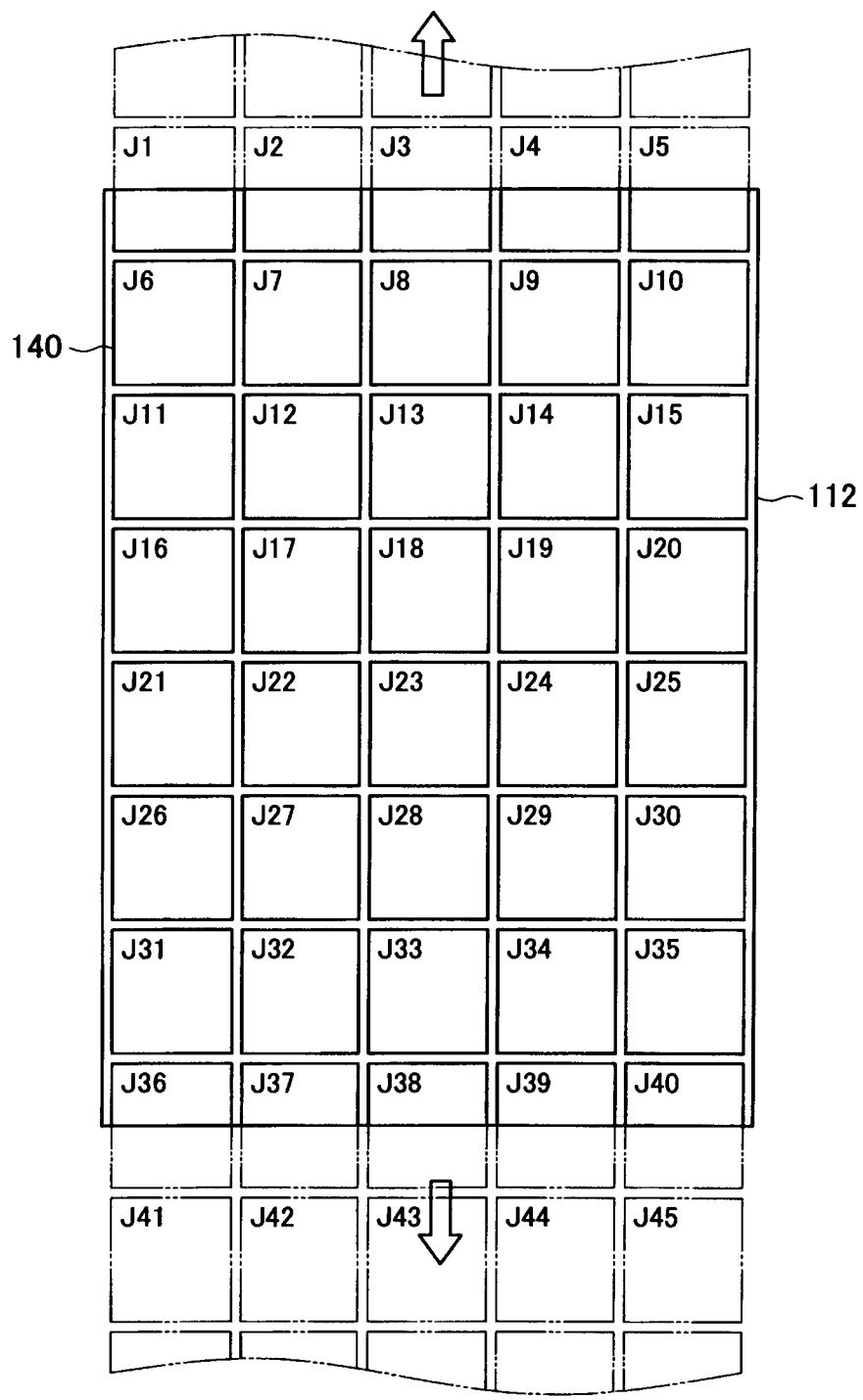
FIG. 5 is an explanatory view which illustrates the relation between images of jackets arranged at a layer L2 and the touch panel.

FIG. 5 is explanatory view which illustrates the relation between images of the jackets 140 arranged at the layer L2 and the touch panel 112.

The images (J1, J2, . . . ) of the plurality of jackets 140 are arranged at the layer L2 in a matrix shape being adjacent to one another. The image of one jacket 140 corresponds to one album. The jackets 140 of the albums stored in the information processing apparatus 100 are sequentially arranged at the layer L2. The jackets 140 which are arranged at the layer L2 but may not be displayed within the screen of the touch panel 112 are sequentially displayed by moving (scrolling) the layer L2 within the screen in the vertical direction. The movement of the layer L2 within the screen is performed by the operation of the scroll wheel 118, for example. Instead, the movement of the layer L2 within the screen may be performed by the operation on the surface of the touch pad 114.

Figure 6:
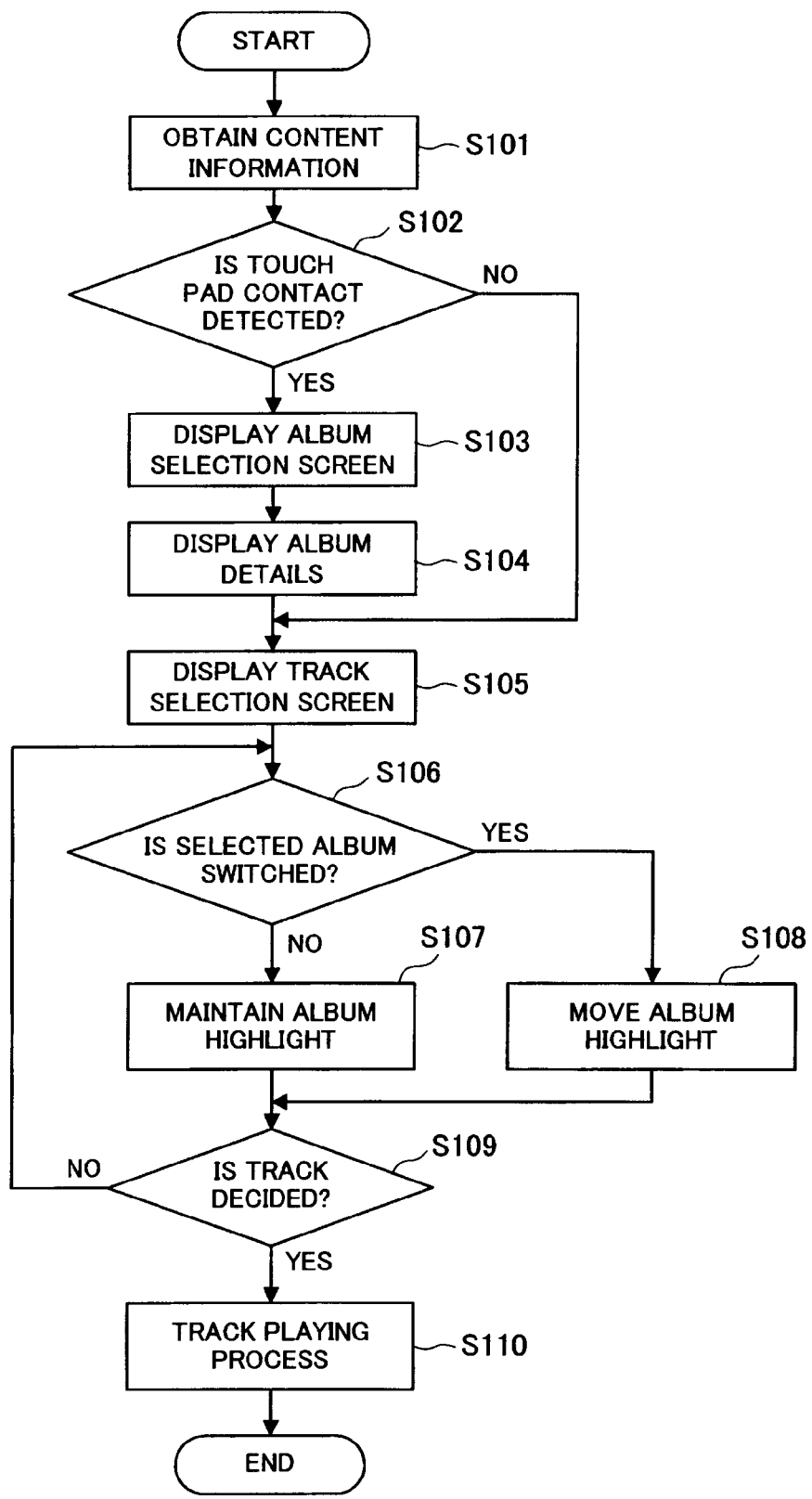
FIG. 6 is a flowchart which describes the operation of the information processing apparatus according to the present embodiment.
Figure 8:
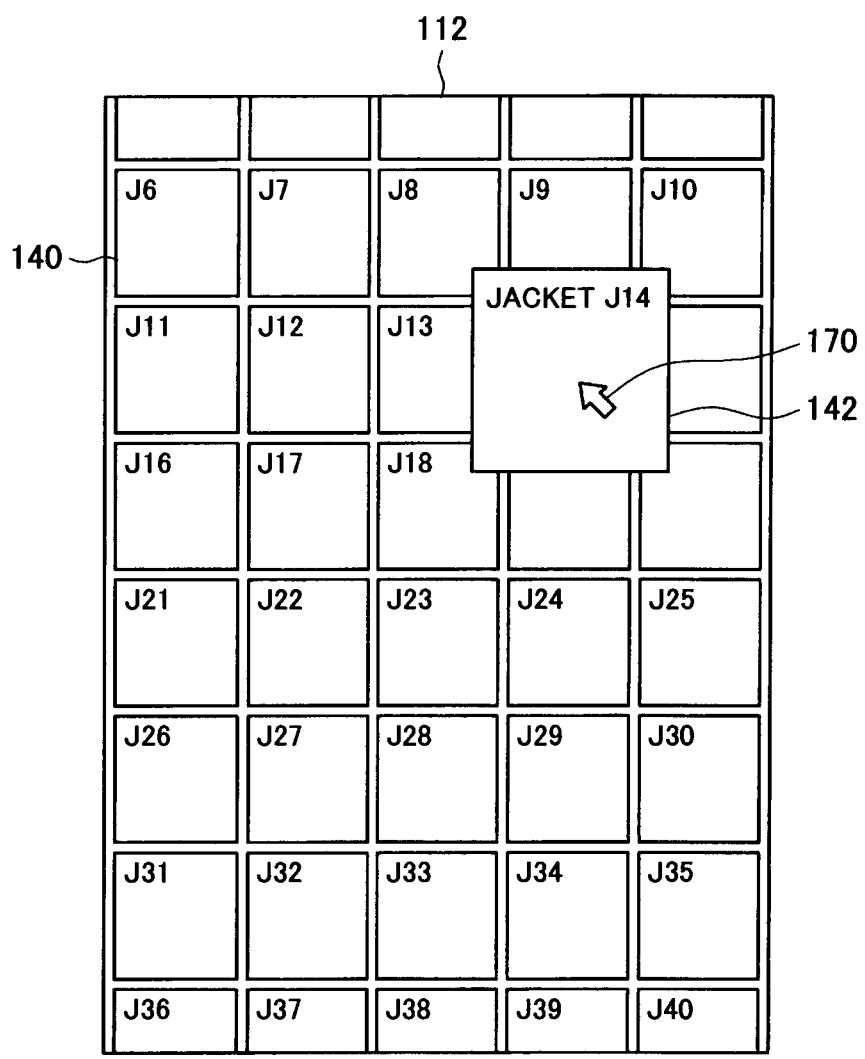
FIG. 8 is an explanatory view which illustrates another example of the screen displayed at the touch panel of the information processing apparatus of the present embodiment.
Figure 9:
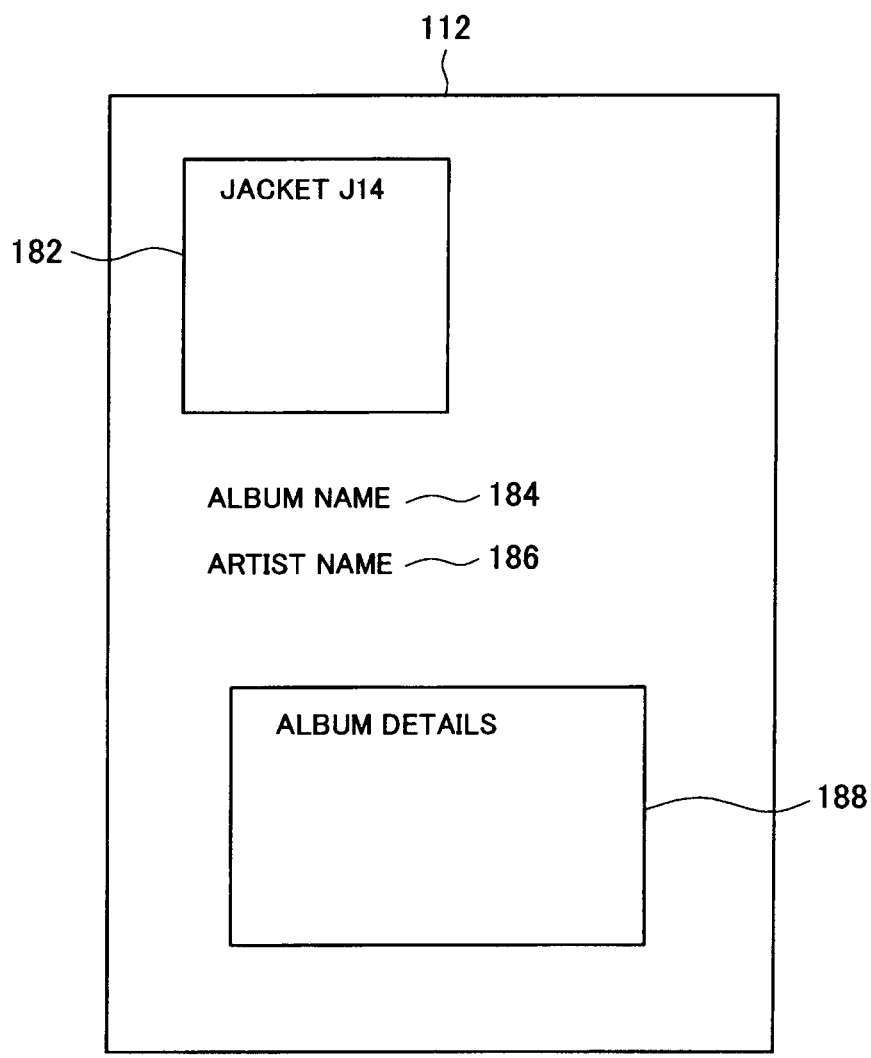
FIG. 9 is an explanatory view which illustrates another example of the screen displayed at the touch panel of the information processing apparatus of the present embodiment.

Next, the operation until the track playing process of the information processing apparatus 100 according to the present embodiment is described with reference to the screen display of the touch panel 112. FIG. 6 is a flowchart which describes the operation of the information processing apparatus 100 according to the present embodiment. FIG. 8 and FIG. 9 are explanatory views which illustrate examples of the screen displayed at the touch panel 112 of the information processing apparatus 100 of the present embodiment.

First, the information processing apparatus 100 obtains content information such as the music data which is stored at the storage 106 (step S101). For example, the music data to be obtained includes album titles, artist names of the albums, album jackets (covers of the albums including pictures and illustrations, for example) and the like. Further, the music data includes track titles of the albums, play times and the like. Here, the information processing apparatus 100 obtains the content information of a plurality of the music data.

Then, it is determined whether or not the touch pad 114 at the surface opposite to the surface where the touch panel 112 of the information processing apparatus 100 is arranged detects contact by a user's operation (step S102). When the contact is detected, it proceeds to an album selection mode to arbitrarily select one album among the plurality of albums. As illustrated in FIG. 8, an album selection screen in which only the plurality of jackets are displayed is displayed in the album selection mode (step S103).

An example of the album selection screen is illustrated in FIG. 8. As illustrated in FIG. 8, the plurality of jackets 140 which respectively correspond to the plurality of albums and the cursor 170 are displayed in the album selection screen. Then, the cursor 170 is moved with the operation of the touch pad 114 by the user. For example, the jacket 142 which is indicated by the cursor 170 may be displayed larger than the other jackets 140, as illustrated in FIG. 8. Instead, not illustrated in the drawings, the jacket which is indicated by the cursor 170 may be displayed being surrounded by a frame such as a selection frame.

Then, when an arbitrary album is selected with the operation (for example, tapping operation etc.) of the touch pad 114 by the user, an album detail description screen as illustrated in FIG. 9 is displayed (step S104).

An example of the album detail description screen is illustrated in FIG. 9. As illustrated in FIG. 9, the album detail description screen displays the jacket 182 for each album, the album name 184, the artist name 186, detail information 188 of the album and the like. Here, it is also possible to directly proceed to a track selection screen to be displayed in step S105 which is described in the following without displaying the album details description screen.

With the above operations of steps S102 through S104, the plurality of albums are displayed with the images of the jackets 140. Therefore, the user can arbitrarily select an album with the images.

Next, a track selection mode of the present embodiment is described. It proceeds to the track selection mode in which a track to be played is selected when the contact at the touch pad 114 is not detected in step S102 or when the displayed album is selected in step S104. In the track selection mode, a track selection screen in which the character strings such as the track titles 130 and the images of the jackets 140 are simultaneously displayed by being superimposed is displayed (step S105), as illustrated in FIG. 7.

As mentioned above, the track selection screen in FIG. 7 displays the track titles 130, the album titles 132, the artist names 134, the partition lines 136, the jackets 140, the track selection frame 150, the album selection frame 160 and the like.

The track selection frame 150 is displayed at a predetermined position within the screen in a fixed manner. The track titles 130 are sequentially placed in the track selection frame 150 one by one by being moved in the vertical direction. The track title 130 placed in the track selection frame 150 is the selected track. In this manner, it is possible to indicate to the user that one track title 130 is selected among the plurality of track titles 130 which are displayed in the screen. Here, as illustrated in FIG. 7, the track title 130 placed in the track selection frame 150 may be displayed larger than the other track titles 130. Further, the displaying to indicate that the track is selected is not limited to the frame in FIG. 7. It is also possible to display with highlighting of reversing characters or changing into a bold type.

The album selection frame 160 is displayed as surrounding the jacket 140 of the album in which the track title 130 placed in the track selection frame 150 is included. In this manner, it is possible to indicate to the user which is the jacket 140 of the album corresponding to the selected track title 130. Here, the displaying to highlight the album is not limited to the frame in FIG. 7. In the screen of FIG. 7, the plurality of jackets 140 are displayed with light color so that the track titles 130 become apparent as mentioned above. Therefore, it is also possible that only the jacket 140 of the album corresponding to the track title 130 placed in the track selection frame 150 is displayed with color deeper than the other jackets 140.

Then, when the track titles 130 are moved upward or downward by the user's operation of the touch panel 112 etc., the prior or the subsequent track title 130 is placed in the track selection frame 150 to be selectable. When the track titles 130 are further moved upward or downward by the user's operation of the touch panel 112 etc, the track title 130 of the prior or the subsequent album is placed in the track selection frame 150 to be selectable.

Alternatively, it is also possible to select the jacket 140 which corresponds to the arbitrary album by moving the album selection frame 160 freely with the operation of the touch pad 114 etc. while maintaining the track selection screen of FIG. 7. In this case, when the selected album is moved, the character strings such as the track title 130 and the album name 132 which are displayed in the track selection screen are changed correspondingly.

Each time the track title 130 selected at the track selection frame 150 is changed by either of the above operations, it is determined whether or not the album corresponding to the track title 130 is switched to another album (step S106). The highlight (emphasis) displaying with the album selection frame stays at the position of the same album until the selected album is switched to another album (step S107). On the other hand, the highlight displaying with the album selection frame 160 is moved to the position of the album corresponding to the track title 130 selected at the track selection frame 150 (step S108) when the selected album is switched to another album. In this manner, the relation between the track title and the album becomes apparent.

Next, it is determined whether or not the track title 130 which is selected at the track selection frame 150 is decided as the track to be played by the user's selection operation of the touch panel 112 (step S109). In the case that the track to be played is decided, the information processing apparatus 100 starts the playing process of the track corresponding to the selected track title 130 (step S110). On the other hand, until the track to be played is decided, the track selection mode is continued and the state that the track to be played is selectable at the track selection screen is continued.

With the above operations of steps S105 through S110, the character strings such as the track titles 130 and the images of the jackets 140 are simultaneously displayed by being superimposed. Therefore, the album information which is the data at the upper layer and the track information which is the data at the lower layer are simultaneously displayed. Consequently, the user can effectively search the music data stored in the information processing apparatus 100.

In related art, in order to display the lower layer data at the screen, the upper layer item which is supposed to include the desired data is needed to be selected. Therefore, it has been difficult to reliably select the lower layer data. Further, when the desired data is not found, it is needed to return to the upper layer and select another upper layer item.

In addition, the image information of the jackets being relatively similar to a square shape and the character string information such as the track names and album names being arranged horizontally or vertically are mixed in the content information such as the music data. Therefore, it has been difficult to effectively arrange the images and the character strings in the screen. For example, although the image can be discriminated from the other images or can be ascertained with a quick look of the user, the character strings are needed to be displayed being legible for the user. On the other hand, in the present embodiment, the images and the characters can be simultaneously displayed by capitalizing on the characteristics of the both while making effective use of the screen area. Further, the user can effectively search the music data stored in the information processing apparatus 100 from either the album (upper layer) or the track title (lower layer).

Further, in the present embodiment, legibility of the data at sight is improved since the upper layer items (album jackets 140) and the lower layer items (track titles 130) are simultaneously displayed. Furthermore, album information such as the album names 132 and the artist names 134 etc. other than the track titles 130 can be displayed as the character strings while simultaneously displaying the upper layer items and the lower layer items.

In addition, in the present embodiment, the operation unit (touch pad 114) to select the upper layer item (album jacket 140) and the operation unit (touch panel 112) to select the lower layer item (track title 130) are separated. For example, although the albums (jackets 140) can be quickly moved with the operation of the touch pad 114, the selection of the track title 130 may not be performed (or the first track etc. of the album is automatically selected). On the other hand, although the track titles 130 can be quickly moved with the operation of the touch panel 112, the switching to the albums which are placed other than the prior and subsequent albums next to the presently displayed album may not freely performed due to the corresponding to the movement of the track titles 130 during the album selection.

In this manner, since the operations for the upper layer data and the lower layer data are separately performed by separate operation units (devices), the respective data searching can be performed at different grading. Therefore, the desired music data can be found more rapidly and easily. The user can seamlessly perform the track title searching and the album searching without switching display mode intentionally.

In the case that a track is selected by moving the track titles 130 at high speed in the vertical direction as an example of the operation of the information processing apparatus 100 of the present embodiment, the character strings flow at high speed and become difficult to be ascertained. However, even in such a case, the highlight displaying of the jacket 140 which indicates the album information is slowly switched to the jacket 140 of another album or the layer L2 is slowly scrolled. For example, in the case that ten tracks are included in each album and jackets are displayed in five-rows horizontally at the touch panel 112 as illustrated in FIG. 7, the movement speed of the highlight displaying of the album is to be one fiftieth of the movement speed of the character strings. Therefore, even in the case that a track is selected by moving the track titles 130 at high speed in the vertical direction, the legibility of the jackets 140 is not affected. Accordingly, the present location of the plurality of music data as a whole can be ascertained even during high speed scrolling of the character strings without utilizing an element of related art such as a scroll bar displayed in the screen.

The present application contains subject matter related to that disclosed in Japanese Priority Patent Application JP 2008-190976 filed in the Japan Patent Office on Jul. 24, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

Figure 10:
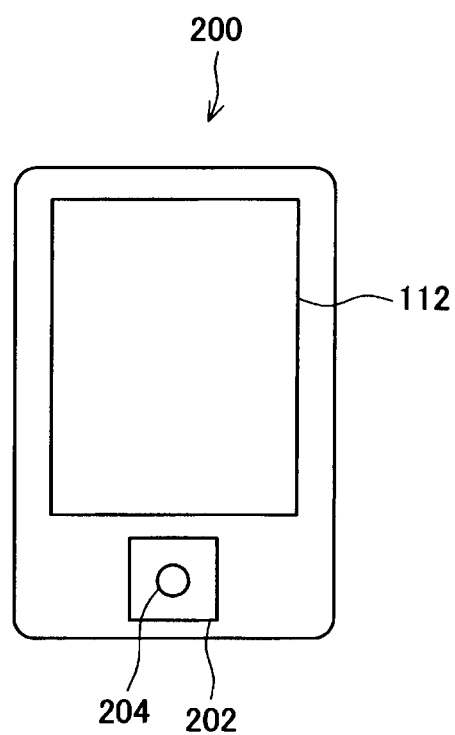
FIG. 10 is a front view of a modified example of the information processing apparatus according to the present embodiment.

In the present embodiment, the configuration that the touch pad 114 is arranged at the information processing apparatus 100 as the second operation unit to select the jacket 140 is described as an example. However, the present invention is not limited to such an example. As illustrated in FIG. 10, the second operation unit may be a cross key button 202 and an entry button 204. FIG. 10 is a front view of a modified example of the information processing apparatus 100 according to the present embodiment. The jacket 140 to be selected can be moved by the cross key button 202 and the album to be displayed at the track selection screen can be determined by the entry button 204.

Figure 11:
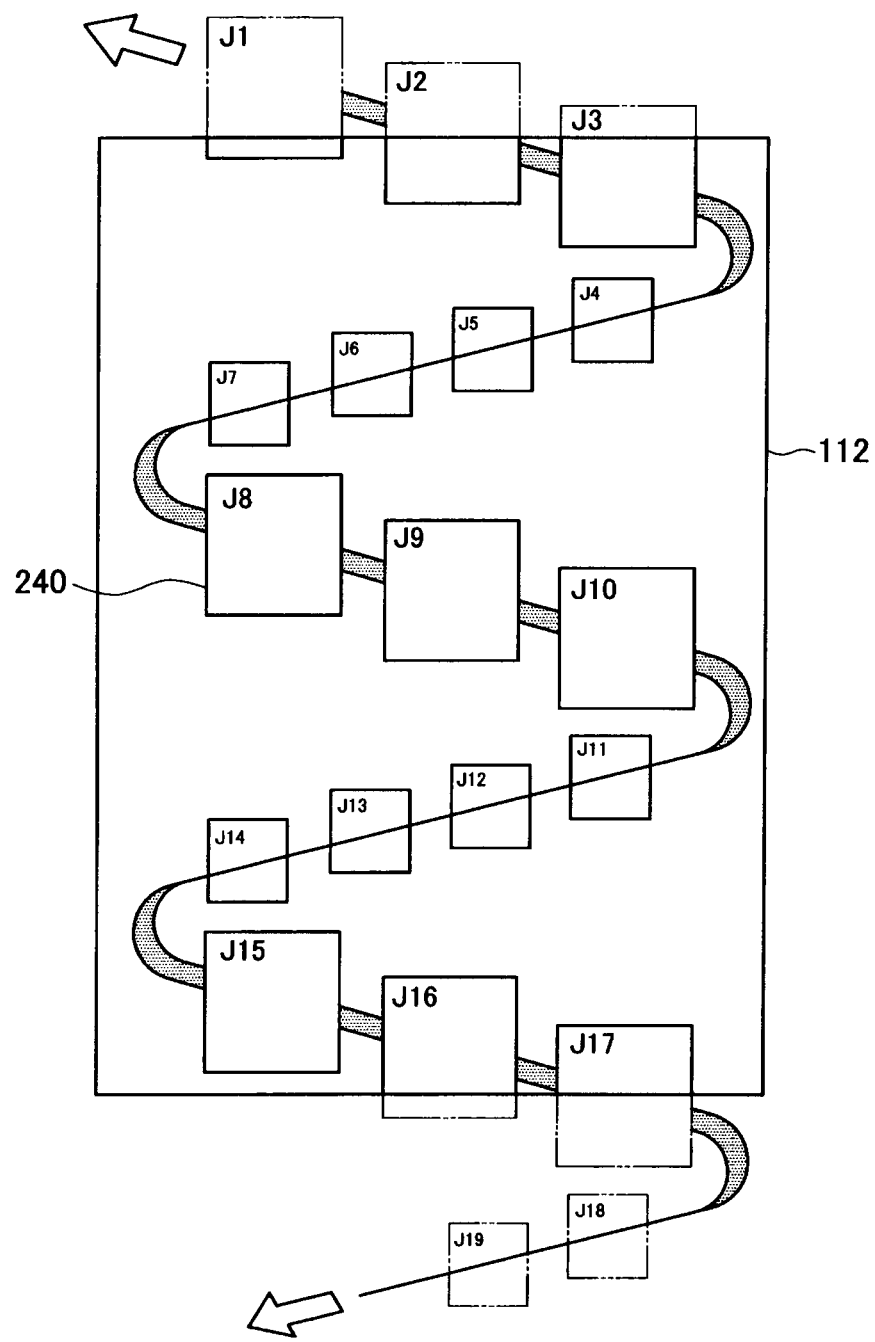
FIG. 11 is an explanatory view which illustrates the relation between images of jackets arranged at the layer L2 and the touch panel.
Figure 12:
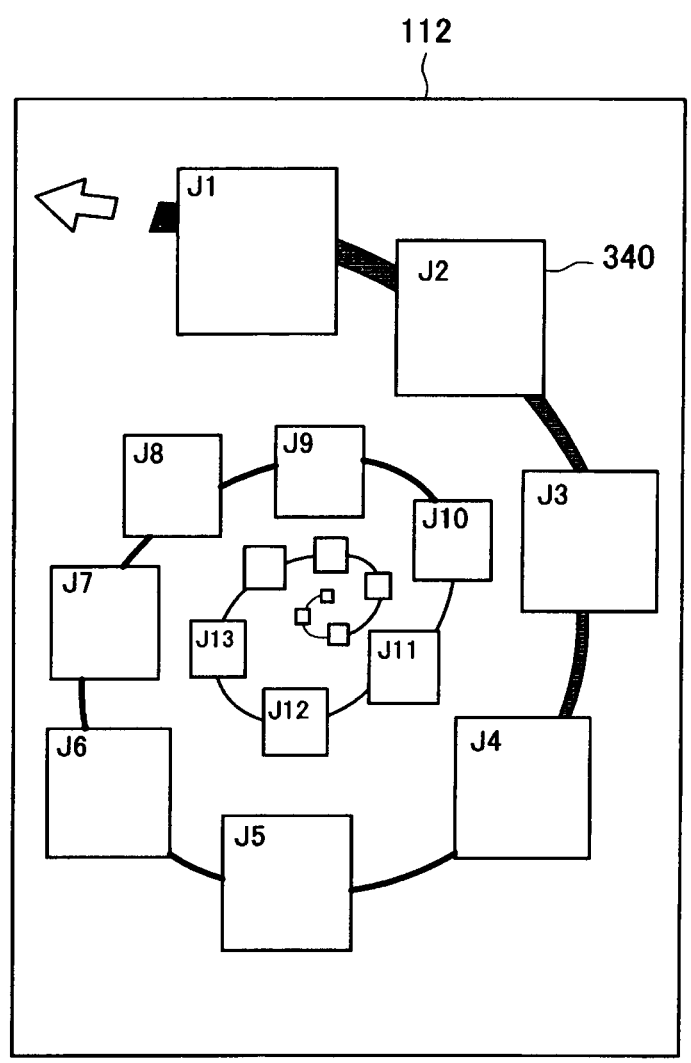
FIG. 12 is an explanatory view which illustrates the relation between images of jackets arranged at the layer L2 and the touch panel.
Figure 13:
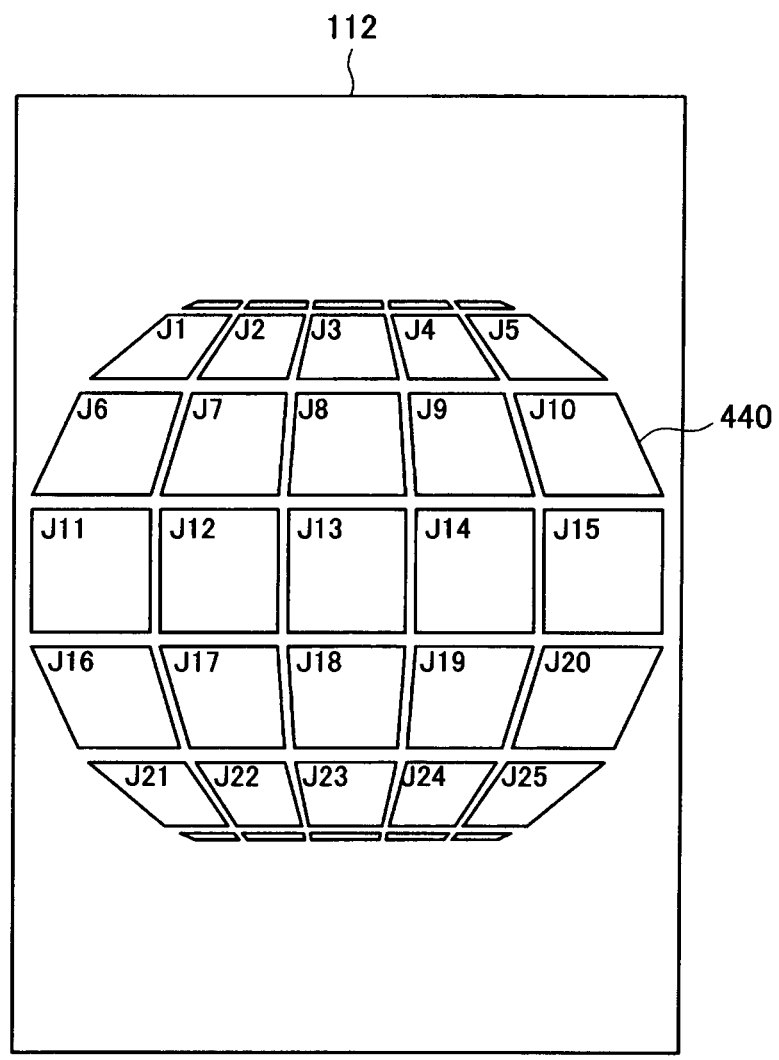
FIG. 13 is an explanatory view which illustrates the relation between images of jackets arranged at the layer L2 and the touch panel.

Further, in the present embodiment, the jackets 140 are arranged at the layer L2 in a matrix shape. However, the present invention is not limited to such an example. The jackets 140 to indicate the albums may be arranged as illustrated in each of FIGS. 11 through 13. FIGS. 11 through 13 are explanatory views which respectively illustrate the relation between the images of the jackets 140 arranged at the layer L2 and the touch panel 112.

For example, jackets 240 may be arranged on a spiral shape as illustrated in FIG. 11. The spiral extended in the vertical direction of the screen is displayed at the touch panel 112 in FIG. 11. The spiral displayed in the screen is the shape viewing the side (side surface) of the spiral. When the touch pad 114 is operated by the user, the spiral is moved in the vertical direction and the jackets 240 are sequentially displayed accordingly.

Further, for example, jackets 340 may be arranged on a spiral shape as illustrated in FIG. 12. The spiral extended rearward from the front of the screen is displayed at the touch panel 112 in FIG. 12. The spiral displayed in the screen is the shape viewing the spiral from the top (or the bottom). When the touch pad 114 is operated by the user, the spiral is moved rearward from the front (or frontward from the rear) and the jackets 340 are sequentially displayed accordingly.

Furthermore, for example, jackets 440 may be arranged on a surface of a circular column (a drum) as illustrated in FIG. 13. The circular column viewed from the side is displayed at the touch panel 112 in FIG. 13. When the touch pad is displayed by the user, the circular column is rotated and the jackets 440 are sequentially displayed accordingly.

In the description of the present embodiment, the data which is displayed by the information processing apparatus 100 is the music data. Then, album information is at the upper layer and the track information is at the lower layer. However, the present invention is not limited to such an example. For example, data including other information such as video data may be adopted. Further, the information of the upper layer is arranged at the layer L2 as the image data and the information of the lower layer against the upper layer is arranged at the layer L1 as the character string data. However, the present invention is not limited to such an example. The present invention can be applied to a case that the image data and the character string data are respectively mated each other and the data is configured not to have a layer structure.

What is claimed is:

1. An information processing apparatus, comprising:
   a first operation unit receiving external operation, the first operation unit being arranged on a first surface of the information processing apparatus;
   a second operation unit receiving external operation, the second operation unit being different from the first operation unit and being arranged on a second surface of the information processing apparatus opposite to the first surface;
   a scroll wheel receiving external operation, the scroll wheel being arranged at a side of the information processing apparatus;
   an input reception unit receiving signals sent by the first operation unit, the second operation unit, and the scroll wheel; and
   a display control unit controlling display of a plurality of first elements and a plurality of second elements, the first elements and the second elements being superimposed, the first elements being arranged to be selectable or movable on a first virtual layer in accordance with the signal sent by the first operation unit and movable in accordance with the signal sent by the scroll wheel, and the second elements being arranged to be selectable or movable on a second virtual layer differing from the first virtual layer in accordance with the signal sent by the second operation unit and movable in accordance with the signal sent by the scroll wheel.

2. The information processing apparatus according to claim 1, wherein the first elements are a character string and the second elements are an image.

3. The information processing apparatus according to claim 1, wherein a layer which includes a group of the first elements is lower than a layer which includes the second elements.

4. The information processing apparatus according to claim 1, wherein the first operation unit is a plane member which is arranged by being superimposed to the display unit.

5. The information processing apparatus according to claim 1, wherein the first elements are a character string which indicates music information and the second elements are an image which indicates the music information.

6. An information processing method comprising the steps of:
   receiving external operation by a first operation unit arranged on a first surface of an information processing apparatus;
   receiving external operation by a second operation unit different from the first operation unit and arranged on a second surface of the information processing apparatus opposite to the first surface;
   receiving external operation by a scroll wheel arranged at a side of the information processing apparatus;
   receiving, by an input reception unit, signals sent by the first operation unit the second operation unit, and the scroll wheel; and
   displaying a plurality of first elements and a plurality of second elements by a display control unit, the first elements and the second elements being superimposed, the first elements being arranged to be selectable or movable on a first virtual layer in accordance with the signal sent by the first operation unit and movable in accordance with the signal sent by the scroll wheel, and the second elements being arranged to be selectable or movable on a second virtual layer different from the first virtual layer in accordance with the signal sent by the second operation unit and movable in accordance with the signal sent by the scroll wheel.

* * * * *